(12) United States Patent
Wendt et al.

(10) Patent No.: US 6,240,200 B1
(45) Date of Patent: May 29, 2001

(54) OPTICAL FINGERPRINT IMAGER WITH IMPROVED OPTICS

(76) Inventors: Barry M. Wendt, 9708 Park Brook Ave., Las Vegas, NV (US) 89134; Rick T. Fiskum, 28690 - 660th Ave., Litchfield, MN (US) 55355

( * ) Notice: Subject to any disclaimer, the term of this patent is extended or adjusted under 35 U.S.C. 154(b) by 0 days.

(21) Appl. No.: 08/921,139

(22) Filed: Aug. 29, 1997

(51) Int. Cl.[7] .................................................. G06K 9/00
(52) U.S. Cl. ........................ 382/127; 382/124; 382/126; 359/15; 359/833
(58) Field of Search .................................. 382/124, 125, 382/126, 127, 210; 359/15, 839, 833, 834; 348/247, 254, 255

(56) References Cited

U.S. PATENT DOCUMENTS

| | | | |
|---|---|---|---|
| 4,544,267 | * | 10/1985 | Schiller .................................... 356/71 |
| 5,047,861 | * | 9/1991 | Houchin et al. ..................... 348/247 |
| 5,109,427 | * | 4/1992 | Yang ..................................... 382/210 |
| 5,233,404 | * | 8/1993 | Lougheed et al. .................... 382/127 |
| 5,416,573 | * | 5/1995 | Sartor, Jr. .............................. 356/71 |
| 5,448,649 | * | 9/1995 | Chen et al. ........................... 382/126 |
| 5,467,403 | * | 11/1995 | Fishbine et al. ...................... 382/116 |
| 5,625,448 | * | 4/1997 | Ranalli et al. ......................... 356/71 |
| 5,650,842 | * | 7/1997 | Maase et al. ......................... 382/125 |

* cited by examiner

*Primary Examiner*—Matthew C. Bella
*Assistant Examiner*—Sheela Chawan
(74) *Attorney, Agent, or Firm*—Joseph R. Kelly; Westman, Champlin & Kelly, P.A.

(57) ABSTRACT

A fingerprint imaging system includes a light source, an optical platen having a light receiving face positioned such that the light from the source impinges thereon, and a finger receiving face positioned such that light from the light source through the light receiving face impinges on the finger receiving face. A light detector is positioned to receive light from the light source reflected from the finger receiving face. The light receiving surface of the platen is configured to avoid reflection of external light passing through the finger receiving face and impinging on the light receiving face.

22 Claims, 6 Drawing Sheets

OPTICAL FINGERPRINT IMAGER WITH IMPROVED OPTICS

BACKGROUND OF THE INVENTION

The present invention deals with an optical system. More specifically, the present invention deals with a fingerprint imaging system.

Fingerprint imaging systems implementing prism technology have been used in the past. Such systems typically take advantage of the total internal reflection characteristics of a prism. In such systems, a light (which is conventionally emitted from a point source through a collimating lens) is input through one face of the prism. The fingerprint is imaged off another face of the prism and the image is reflected through an output face of the prism.

In such prior systems, a right angle prism is typically used. Thus, the light source is provided through one leg of the prism and the fingerprint is imaged off of the hypotenuse of the prism (i.e., the hypotenuse is used as the reflecting surface of the prism). The image is then reflected out of the other leg of the prism.

The optical image travels through a corrective lens and is provided to an imaging device such as a linear charge coupled device or an area array charge coupled device. The intensity of the light provided to the charge coupled device is converted to an analog signal which is used in a variety of ways.

Such prior systems are plagued by a number of problems. First, it is very difficult to completely preclude external light from entering through the reflecting face of the prism. Due to the total internal reflection characteristics of the prism, once external light has entered the prism it acts essentially as noise which causes a loss of image contrast and therefore loss of definition of the image reflected out through the output face of the prism. Also, external light can tend to invert the image (i.e., either invert it from black to white or white to black).

Another significant problem associated with prior fingerprint imaging systems is caused by debris or residue which is left on the prism face. If the residue is particulate matter or other light obstructing matter, it can result in an erroneously scanned image and therefore an erroneous image at the output of the prism. However, residue can also exist in the form of excess moisture or oil which is left on the reflecting face. This also has a deleterious effect on the image reflecting capability of the prism.

the problems which result from both external light entering the prism, and debris or residue accumulating on the prism face are typically referred to as ghosting.

Image distortion is another problem associated with prior imaging systems. Image distortion results in a skewed image (for example, where the image is a circle, it can be reflected out of the prism as an elliptical shape). The distortion can arise from aberrations introduced by the optics in the system. Prior systems have had difficulty in efficiently and economically adjusting the image reflected out of the prism to accommodate for such distortion.

Yet another problem associated with prior imaging systems is the inability to obtain different or optimum image sizes. The lens which receives the reflected image from the prism in prior systems is typically a correcting lens which does not provide a flat field image to the imaging device. Therefore, the correction provided by the lens is only effective for one predetermined distance between the corrective lens and the imaging device. It is thus impossible to change the size of the image provided to the imaging device by moving the corrective lens relative to the imager without destroying the corrective effect provided by the correcting lens.

SUMMARY OF THE INVENTION

A fingerprint imaging system includes a source, an optical platen having a light receiving face positioned such that light from the source impinges thereon, and a finger receiving face positioned such that light received from the light source through the light receiving face impinges on the finger receiving face. A light detector is positioned to receive light from the light source reflected from the finger receiving face. The light receiving face of the platen is configured to avoid reflection of external light passing through the finger receiving face and impinging on the light receiving face.

In another embodiment, the present invention includes a light emitter as the light source wherein the light emitter includes an array of point light sources. In another embodiment of the present invention, a plurality of space diffuser elements are arranged relative to the light emitter to receive and diffuse light emitted from the light emitter.

In a further embodiment of the present invention, the light detector includes a plurality of image correcting elements receiving light reflected from the finger receiving face. The image correcting elements provide a flat field image at an output thereof to an imager.

In another embodiment according to the present invention, a template is formed for processing the analog image signal based on a blank image scan input into the optics of the system. The system scales and normalizes the image signal to form the template. The template is used in forming and correcting image signals during later image scans.

DETAILED DESCRIPTION OF THE PREFERRED EMBODIMENTS

Figure 1:
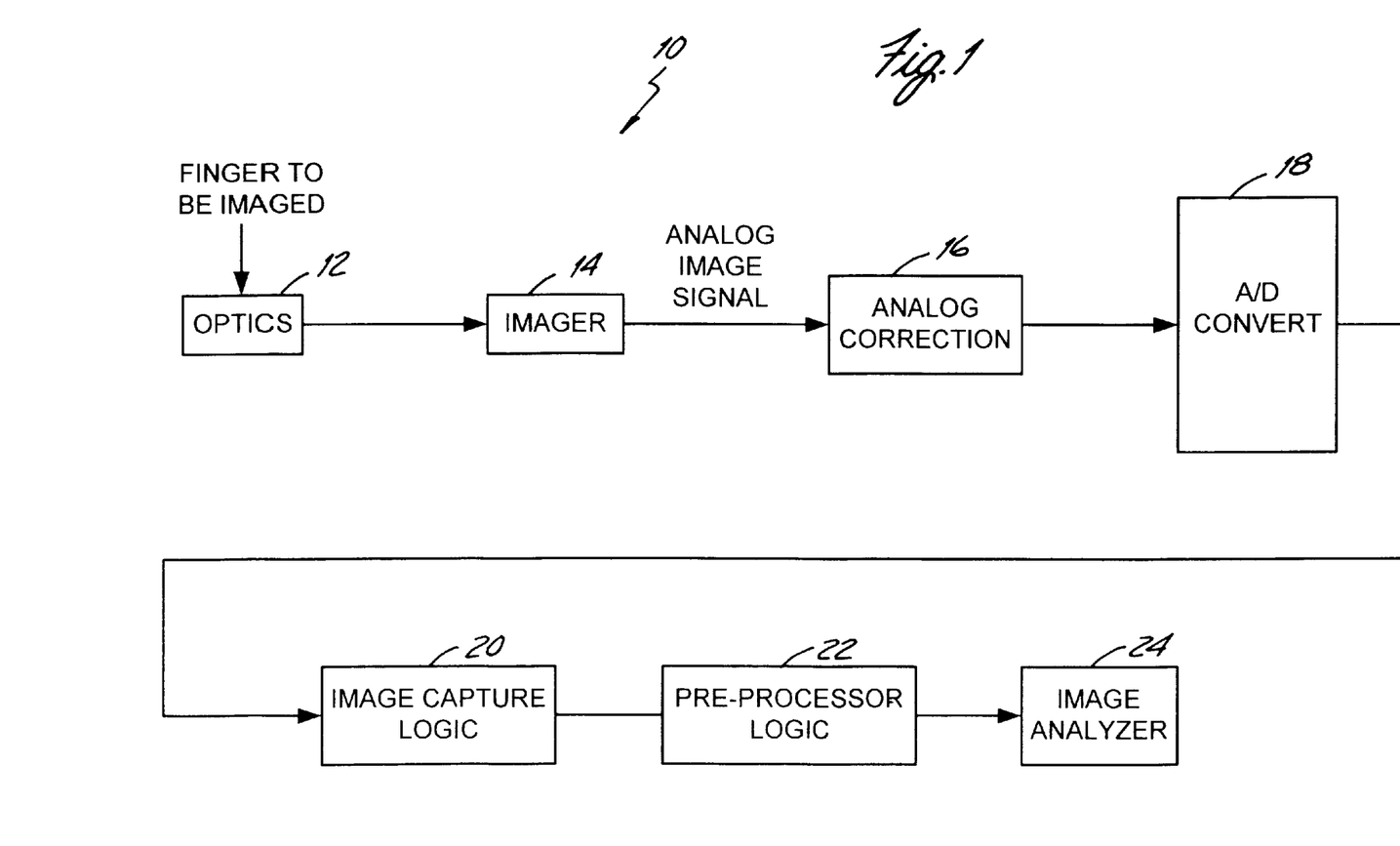
FIG. 1 is a block diagram of a fingerprint imaging system according to the present invention.

FIG. 1 is a block diagram of a fingerprint imaging system 10 according to the present invention. Imaging system 10 includes optics portion 12, imager 14, analog correction circuit 16, analog-to-digital (A/D) converter 18, image capture logic 20, preprocessor logic 22 and image analyzer 24. Optics portion 12 will be discussed in greater detail with respect to FIGS. 2–4. Briefly, optics portion 12 includes an optical platen which has a reflecting face which receives the finger to be imaged. Light is input into the platen by a light emitter and the image of the finger is reflected out of the platen, through optical correction elements, and is provided as a flat field image to imager 14.

In one preferred embodiment, imager 14 is a charge coupled device. However, imager 14 can be any suitable imager which receives the optical signal from optics portion 12 and provides an analog image signal indicative of the optical signal received.

The image signal is provided from imager 14 to analog correction circuitry 16. Analog correction circuitry 16 will also be described in greater detail with respect to FIG. 5. Briefly, analog correction circuitry 16 is preferably a hardware circuit which reduces noise associated with the analog image signal by filtering out certain spectra of the video signal and by providing gain compensation and scaling to accommodate for gain irregularities in the optical system.

The corrected analog signal is then provided from analog correction circuitry 16 to A/D converter 18. A/D converter 18 is preferably a conventional A/D converter which provides a digital output representative of the analog signal received at its input. The digital output is provided to image capture logic 20. Image capture logic 20 is also preferably a conventional circuit which simply arranges the digital signal received from A/D converter 18 into a digitized image which can be stored (in solid state memory, for instance) and which can be manipulated.

The digitized image is then provided from image capture logic 20 to preprocessor logic 22. Preprocessor logic 22 will be described in greater detail with respect to FIG. 5. Briefly, however, preprocessor logic 22 is preferably a software logic module which identifies lighting characteristics in the image which indicate a variation in lighting or optical characteristics of the optics portion 12 which need to be corrected. Preprocessor logic 22 corrects for these variations in optical characteristics and provides a corrected image to image analyzer 24.

Image analyzer 24 varies with application, but preferably analyzes the images received for whatever purpose they are received. In one preferred embodiment, image analyzer 24 compares fingerprints imaged at optical portion 12 to a data base of fingerprints to determine whether the fingerprint is within the data base. This can be used, for instance, as a security measure to determine whether the person who places the finger on the optics portion 12 is authorized to enter a room, to access a bank account, or to take any other variety of actions.

Figure 2:
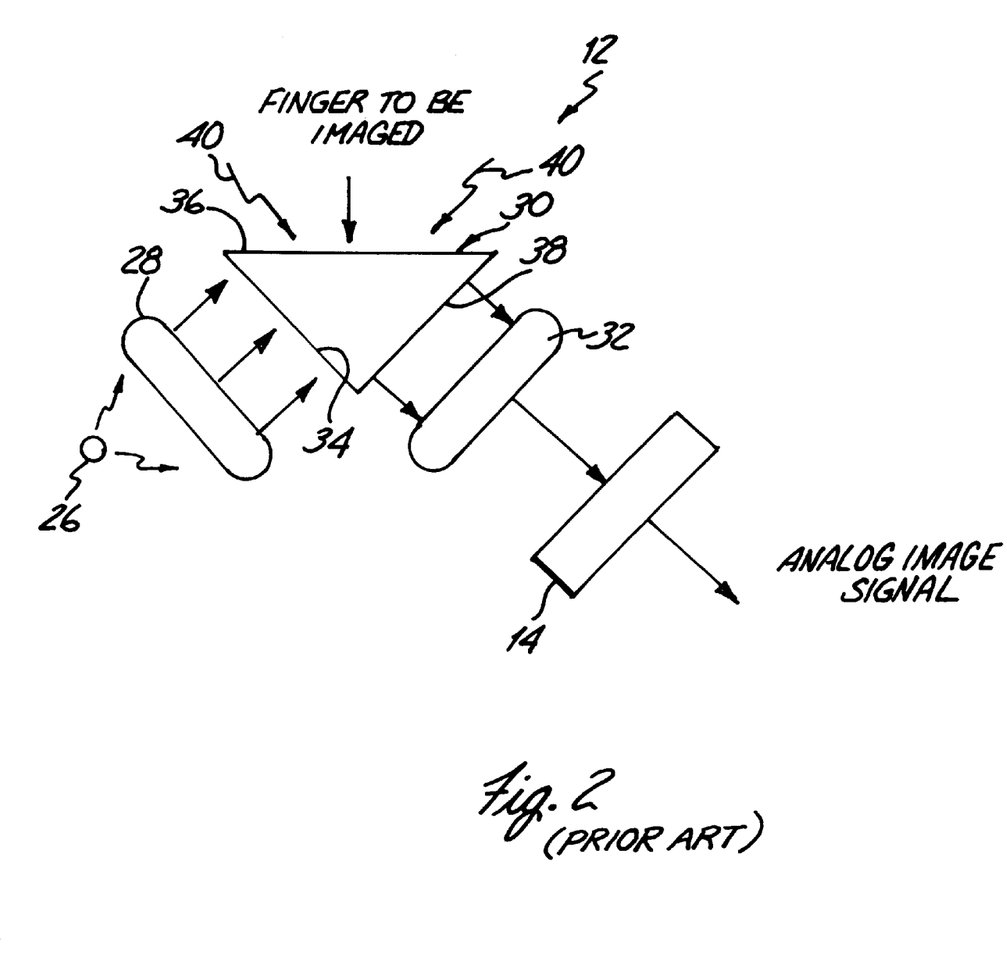
FIG. 2 is a diagram of an optical portion of a fingerprint imaging system according to the prior art.

FIG. 2 is a diagram of an optics portion 12 according to the prior art. Optics portion 12 includes point light source 26, collimating lens 28, optical platen (or prism) 30, corrective lens 32 and imager 14. The light emitted by point light source 26 is collected at collimating lens 28. This light is input through a light receiving face 34 of platen 30. The finger to be imaged is placed on reflecting face 36 of platen 30 and the fingerprint image is reflected out of platen 30 through output face 38. Correcting lens 32 is placed in the light travel path in an effort to correct the image signal reflected out of platen 30 for irregularities, and to focus the image signal on imager 14. However, in prior systems, correcting lens 32 typically does not provide a flat field image at its output. Therefore, the correction provided by correction lens 32 is only effective when imager 14 is placed a predetermined distance away from lens 32.

Since optics portion 12 provides light through input face 34 by only a point light source 26 which is collimated by collimating lens 28, the light input is of a fairly low intensity. This can result in a number of problems. For instance, it is very difficult to completely block out all external light (represented by arrows 40 in FIG. 2) from entering through reflecting face 36 of platen 30. Because of the total internal reflection properties of platen 30, the external light entering platen 30 may typically reflect off of face 34 and be added to the reflected image signal as noise, and reflected out through output face 38 of platen 30. Since the light input to the system by point source 26 is fairly weak, it does not take a great deal of external light entering platen 30 to overpower this and therefore cause reverse imaging. In addition, it does not take a great deal of excess moisture or other debris or residue to be left on the faces of platen 30 to cause significant noise in the system. In other words, since the light provided by point source 26 to platen 30 is of a fairly low intensity, even small bits of debris or residue or moisture left on the face of platen 30 have a fairly great weighting effect in the image signal which is reflected out of platen 30. This is undesirable.

Figure 3:
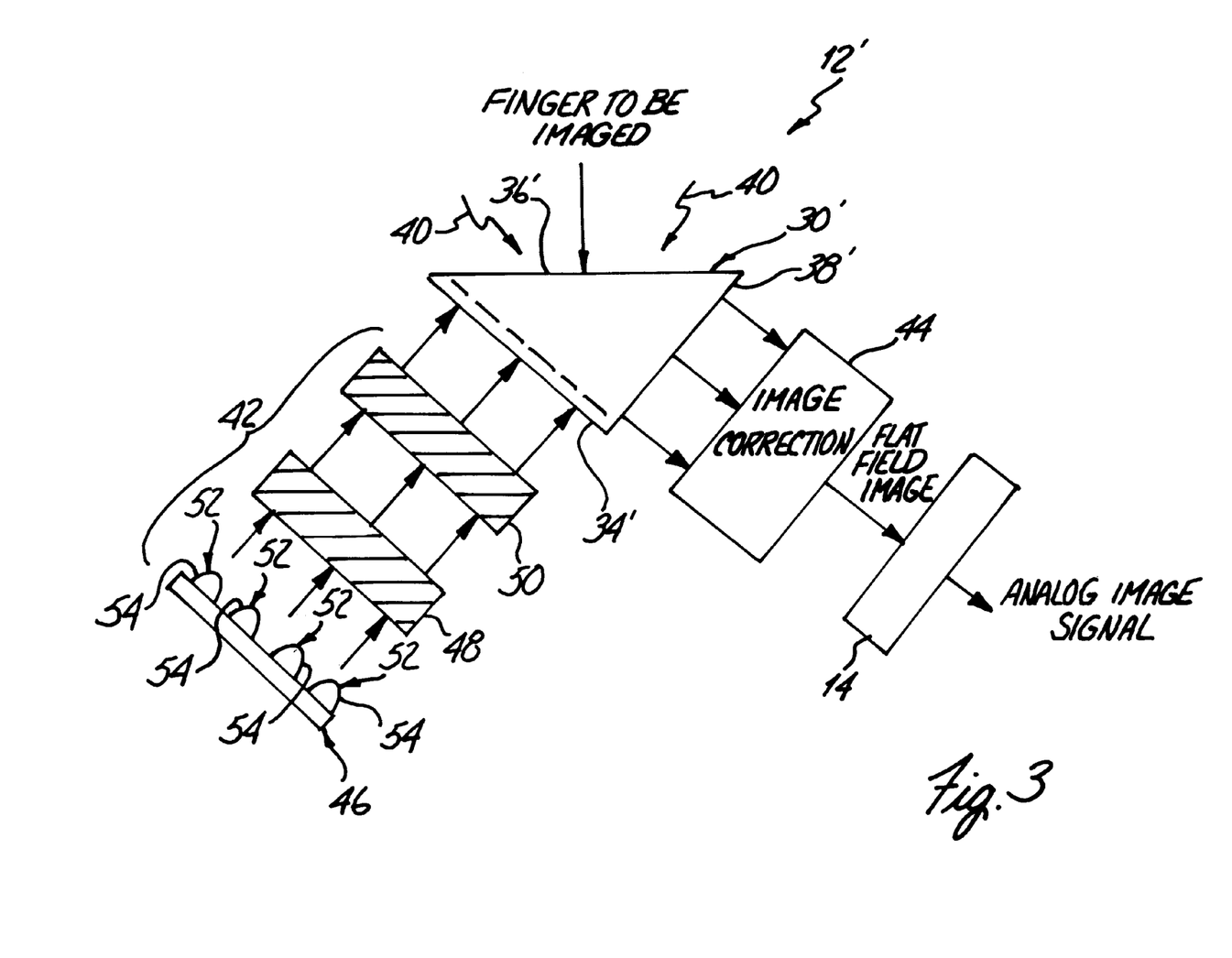
FIG. 3 is a diagram of an optical portion of a fingerprint imaging system according to the present invention.

FIG. 3 is a diagram of an optics portion 12' according to the present invention. Similar items are similarly numbered to those shown in FIG. 2. Optics portion 12' includes light emitter 42, optical platen 30', image correction system 44 and imager 14. Light emitter 42 includes light source 46, first diffuser 48 and second diffuser 50.

In the preferred embodiment, light source 46 includes an array of high intensity light emitting diodes 52. In one preferred implementation, the array is a four by four array of high intensity light emitting diodes 52. The characteristics of each diode 52 are such that light is distributed through a built-in convex lens 54 located thereon. The light emitted by light source 46 is then provided through a diffusion system which includes, in the preferred embodiment, diffusers 48 and 50. The first diffuser 48 partially diffuses the concentrated light of the diode array. The light then enters an air space mixing chamber between diffusers 48 and 50 and then passes through second diffuser 50 and is spread even more uniformly. The light then enters through the input face 34' of optical platen 30'. In the preferred embodiment, diffusers 48 and 50 are white acrylic diffusers, and diffuser 50 is spaced approximately 10 to 20 thousandths of an inch from input face 34' of platen 30'.

The light entering input face 34' is preferably totally reflected off reflecting face 36' in platen 30' and reflected out through output face 38' of platen 30'. The image reflected out of output face 38' is corrected by image correction system 44 and is provided as a flat field image signal to imager 14.

It should be noted that, in the preferred embodiment, optical platen 30' is formed of a right angle prism and the hypotenuse of the right angle prism forms reflecting surface 36'. Therefore, light from light source 46 enters one leg of the right angle prism, impinges on the hypotenuse thereof, and is totally reflected internally and passed out the opposite leg of the prism.

Input face 34', in the preferred embodiment, is frosted. By frosting it is meant that the input face 34' is ground or textured, or otherwise configured to avoid internal reflection of external light which enters through imaging face 36'. In one preferred embodiment, input face 34' is ground in order to achieve a surface finish of approximately 9 to 14 microinches.

In the preferred embodiment, the frosting of surface 34' is performed by finely lapping the surface. The frosting of the surface should result in a uniformly lapped surface within a given range. If the texture of the surface is too fine, this will result in too much reflection of the external light which has entered the prism. However, if the textured surface is too coarse, this results in an image which is undesirably grainy.

The light emitter 46 and frosted input face 34' provide several advantages. Light emitter 46 is formed of a very bright diode array and is very intense relative to the light emitted by a single source 26 of the prior art. Further, the intense light provided by emitter 46 is diffused through a plurality of diffusers 48 and 50 to evenly distribute the light spatially. Therefore, this intense light drastically reduces the effects of any external light entering through reflecting face 36', and such external light has a relatively low weighting effect on the reflected image signal output from platen 30', when compared to prior art systems. In other words, the light from source 46 substantially overpowers any external light entering through reflecting face 36'. Also, because of the intensity of the light provided by light source 46 and diffusers 48 and 50, any noise input into the optical system because of debris or residue left on the faces of platen 30' affects the output of the optical system to a much lesser extent than in the system of the prior art. In fact, it has been found that the high intensity collimated light input into the system of the present invention substantially eliminates ghosting which was caused by excess moisture on the surfaces of platen 30'.

Further, since input face 34 is frosted or ground, any external light which enters platen 30' and impinges on face 34' diffuses. This substantially converts platen 30' into a unidirectional total internal reflection (TIR) prism, rather than a biodirectional TIR prism. Thus, the bright light source and the frosted input face substantially eliminate ghosting from the present system. It has been found that quite intense external light can be impinged on reflecting face 36' without significantly affecting the image output to image correction system 44.

The formed input face 34' has another purpose as well. It has been found that this type of surface helps to further diffuse the light entering through input face 34'.

Figure 4:
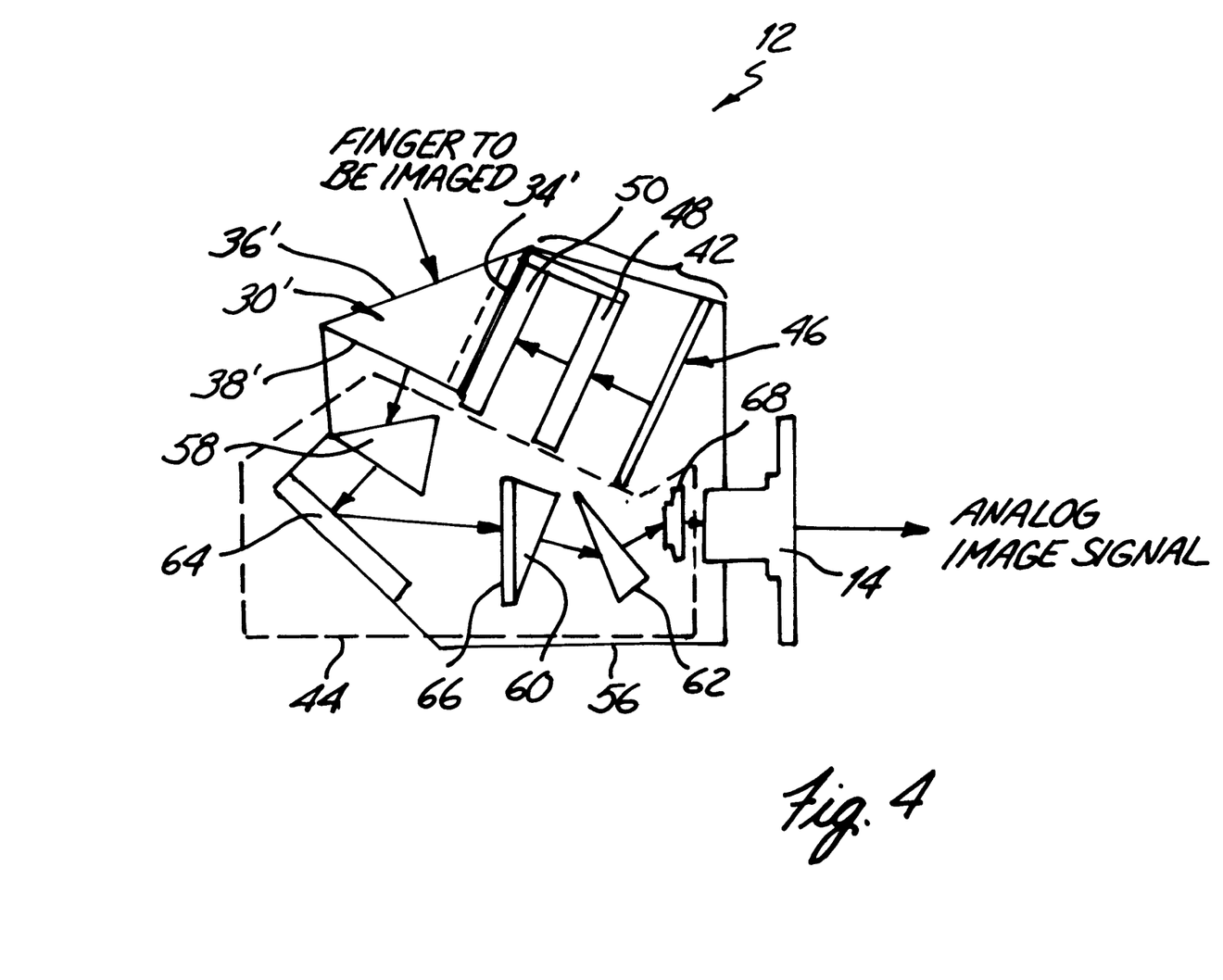
FIG. 4 is a more detailed diagram of the optical system shown in FIG. 3.

FIG. 4 is a more detailed illustration of optic system 12 showing image correction system 44 in greater detail and showing the entire optic system 12 implemented in a housing 56. Similar items are similarly numbered to those shown in FIG. 3. In the preferred embodiment, housing 56 is an opaque housing which provides a window to accommodate reflecting face 36' of optical platen 30'.

Image correction system 44, in the preferred embodiment, includes a plurality of image correcting wedges 58, 60 and 62, a folding mirror 64, imaging lens 66 and final focusing lens 68. The optical signal exiting optical platen 30' travels along a light path which passes through optical wedge 58, is redirected by folding mirror 64, passes through imaging lens 66 and optical wedge 60, then passes through optical wedge 62 and is provided to final focusing lens 68. The final focusing lens 68 provides an image signal to imager 14.

Because, in one preferred embodiment, the fingerprint is being imaged off of reflecting surface 36' which forms the hypotenuse of optical platen 30', the amount of glass through which the reflected light travels is not the same across the entire exit face 38' of optical platen 30'. Therefore, correcting wedge 58 is provided to bend the light to correct for this distortion. The light reflected through the output face of optical wedge 58 is directed to folding mirror 64 which simply redirects the light beam toward imaging lens 66. In the preferred embodiment, imaging lens 66 is an objective lens which picks up and condenses the image. The image is then provided through correcting wedges 60 and 62 which are shaped to remove any skew or distortion which was not corrected by first correcting wedge 58. In other words, their wedges 58, 60 and 62 are used for the anamorphic imaging properties which provide the ability to change the diameter of the collimated light beam with the refractive power of the wedge. The wedges are used to expand or contract the size of the beam in just one meridian to correct for any remaining distortion in the system.

The image is then collected by focusing lens 68. In the preferred embodiment, focusing lens 68 is not a correcting lens, but simply acts to collect the image and focus it as a flat field image on imager 14. This provides the ability to change the image size provided to imager 14 simply by changing the distance which imager 14 lies from focusing lens 68. In other words, by changing the distance between lens 68 and imager 14, the area on the imaging surface 36' or optical platen 30' which is seen at the input to imager 14, with any given magnification, changes as well. This is highly advantageous over prior systems in which the final focusing lens is also a correcting lens which required the final focusing lens to be placed a predetermined distance from imager 14, or the correction would be ineffective and the image would be distorted.

Figure 5:
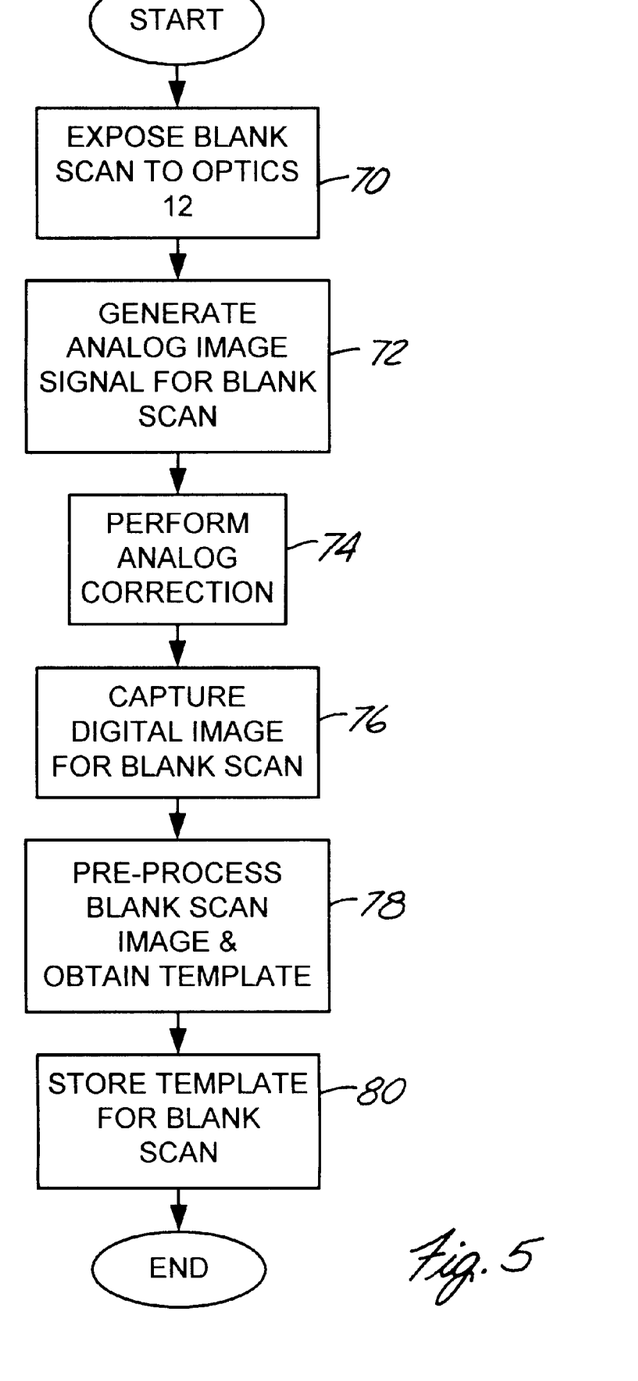
FIG. 5 is a flow diagram illustrating the formulation of a template according to the present invention.

FIG. 5 is a flow diagram illustrating preferred operation of system 10 shown in FIG. 1. In one preferred mode of operation, system 10 is operated without a fingerprint image being processed. Instead, a blank image is processed to obtain a template which is used in correcting later images.

In order to obtain the template, optics 12 is first exposed to a blank image. This is indicated by block 70 in FIG. 5. The optics portion 12 provides an optical image signal to imager 14 as described with respect to FIGS. 3 and 4. Optical imager 14 then generates an analog image signal indicative of the blank scan imaged by optics 12. This is indicated by block 72. The analog image signal then undergoes analog correction which is performed by analog correction circuitry 16.

When the sizes of the components in optics portion 12 are quite small, as is preferred with the present invention, shading at the fringes of the image can occur, and can vary based on tolerance variations in the optical elements. Therefore, analog correction circuitry 16 preferably includes an electronic hardware circuit which controls the information content of the image signal to reduce the noise in the signal. Certain spectra of the video signal are filtered out because they are undesirable. In addition, gain compensation (automatic gain control) is also typically provided to accommodate for gain irregularities in the optical system. The automatic gain compensation preferably performs substantial normalization of the signal amplitudes of the analog signals received. This tends to overcome shading at the fringes of the image. Analog correction circuit 16 can be implemented in software or firmware, but it is preferably implemented in hardware which has been observed to perform the necessary corrections much more quickly. The performance of analog correction is indicated by block 74.

The corrected analog signal is then converted to a digital signal and the digital image which corresponds to the blank scan is captured and converted to a digitized form in a known manner. The digitized image is suitable for manipulation and further processing. This is indicated by block 76.

The digitized image then undergoes preprocessing at preprocessing logic 22. In the preferred embodiment, preprocessing logic 22 is a software module which receives the digitized image indicative of the blank scan and identifies lighting characteristics of the image which tend to indicate variation in lighting or optical properties or characteristics of the optical system which need to be corrected. In one preferred embodiment, preprocessor logic 22 generalizes the characteristics identified and determines normalization constants required to normalize these values to correct for the undesirable variations. Such variations may typically be caused by a variation in size tolerance of the optical components on a unit-by-unit basis. Once the normalization constants are obtained, they are stored as a template for future use. The preprocessing logic 22 may typically be performed by a microprocessor or microcomputer, or other suitable digital computer or controller. The preprocessing and template storage steps are indicated by blocks 78 and 80 in FIG. 5.

Figure 6:
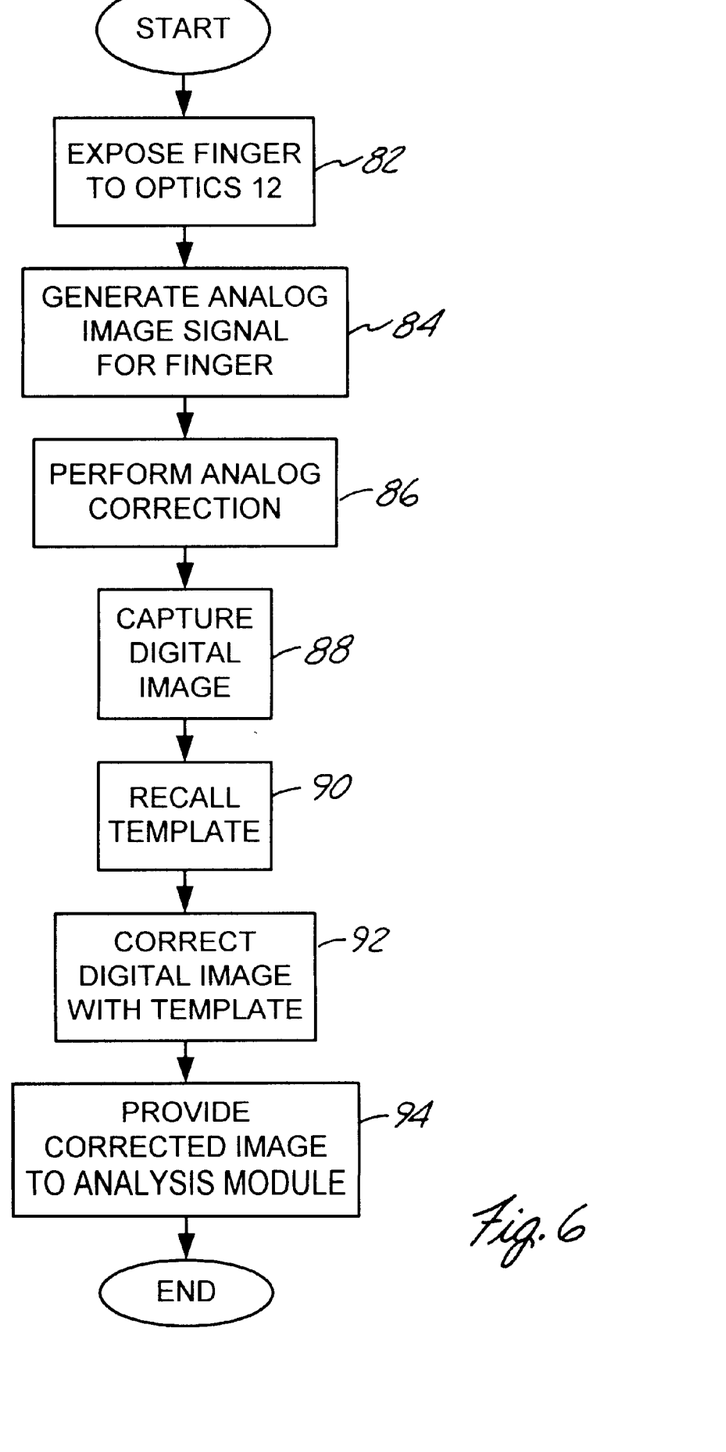
FIG. 6 is a flow diagram illustrating image correction, in accordance with the present invention, using the template formed as discussed with respect to FIG. 5.

FIG. 6 is a flow diagram which illustrates operation of system 10, shown in FIG. 1, during imaging of a fingerprint. First, a finger is exposed to optics 12. This is indicated by block 82 in FIG. 6.

The optical signal indicative of the reflected fingerprint image is then provided to imager 14, as indicated with respect to FIGS. 3 and 4. Imager 14 then generates an analog image signal indicative of the optical signal received. This is indicated by block 84.

The analog image signal then undergoes analog correction, as described with respect to analog correction circuitry 16. This is indicated by block 86.

The corrected analog signal is then provided to A/D converter 18 and image capture logic 20 which convert the analog signal into a digital signal and digitizes the image, in a known manner, so that it can be manipulated and stored. This is indicated by block 88 in FIG. 6.

The template is then recalled and used in further correcting the digitized image which was captured as indicated at block 88. In the preferred embodiment, the template is recalled in the form of normalization constants which are applied to the digitized image to normalize the signals and the digitized image according to the constants formed for the blank scan. These steps are indicated by blocks 90 and 92. The corrected, digitized image is then provided to image analyzer 24 for analysis. This is indicated by block 94.

Therefore, it can be seen that the present invention provides an optics portion having a high intensity light emitter system and an optical platen which work together to substantially eliminate ghosting. Further, the optics portion has a number of correcting elements which provide a near perfect image as a flat field image to the imager. This provides for highly accurate imaging by the imager, and also provides the ability to change the size of the image which is presented to the imager simply by changing the distance between the output of the optics portions and the imager. Further, the present invention provides analog correction circuitry and preprocessing which can be used to create and store a template. The template is applied to later imaging operations to correct the images provided by the system. This corrected image is then provided to any of a number of suitable analysis modules for further processing.

Although the present invention has been described with reference to preferred embodiments, workers skilled in the art will recognize that changes may be made in form and detail without departing from the spirit and scope of the invention.

What is claimed is:

1. A fingerprint imaging system, comprising:
 a light source;
 an optical platen having a light receiving surface positioned such that light from the light source impinges thereon, and a finger receiving surface positioned such that light from the light source passing through the light receiving surface impinges on the finger receiving surface;
 a light detector positioned relative to the platen to receive light from the light source reflected from the finger receiving surface; and
 wherein the light receiving surface of the platen is textured to avoid internal reflection of external light passing through the finger receiving surface and impinging on the light receiving surface.

2. The fingerprint imaging system of claim 1 wherein the light receiving surface is textured to diffuse external light passing through the finger receiving surface and impinging on the light receiving surface.

3. The fingerprint imaging system of claim 2 wherein the light receiving surface is frosted.

4. The fingerprint imaging system of claim 2 wherein the light receiving surface is roughened.

5. The fingerprint imaging system of claim 4 wherein the light receiving surface is ground to have a surface finish in a range of approximately 9 to 15 microinches.

6. The fingerprint imaging system of claim 1 wherein the platen is configured as a unidirectional total internal reflection prism.

7. The fingerprint imaging system of claim 1 wherein the light source comprises:
 an array of point light sources.

8. The fingerprint imaging system of claim 7 wherein each of the plurality of point light sources comprises:
 a high intensity light emitting diode having a convex lens.

9. The fingerprint imaging system of claim 7 wherein the light source further comprises:
 a light diffuser system arranged relative to the array of point light sources to diffuse light emitted by the array of point light sources.

10. The fingerprint imaging system of claim 9 wherein the light diffuser system comprises:
 a plurality of spaced diffuser elements.

11. The fingerprint imaging system of claim 10 wherein each of the plurality of spaced diffuser elements comprises a white acrylic diffuser.

12. The fingerprint imaging system, comprising:
 a light emitter including an array of point light sources and a plurality of spaced diffuser elements;
 an optical platen having a light receiving face positioned such that light from the light emitter impinges thereon, and a finger receiving face positioned such that light from the light emitter passing through the light receiving face impinges thereon; and
 a light detector positioned relative to the platen to receive light from the light emitter reflected from the finger receiving face.

13. The fingerprint imaging system of claim 12 wherein each of the plurality of point light sources comprises:
 a high intensity light emitting diode.

14. The fingerprint imaging system of claim 13 wherein each light emitting diode includes a convex lens.

15. The fingerprint imaging system of claim 12 wherein each of the plurality of spaced diffuser elements comprises a white acrylic diffuser.

16. The fingerprint imaging system, comprising:
 a light emitter;
 a plurality of spaced diffuser elements arranged relative to the light emitter to receive and diffuse light emitted from the light emitter;
 an optical platen having a light receiving face positioned such that light from the light emitter which passes through the plurality of diffuser elements impinges on the light receiving face, and a finger receiving face positioned such that light from the light emitter passing through the light receiving face impinges on the finger receiving face;

wherein the light receiving face of the platen is configured to avoid internal reflection of external light passing through the finger receiving face and impinging on the light receiving face; and a light detector positioned relative to the platen to receive light from the light emitter reflected from the finger receiving face.

17. The fingerprint imaging system of claim 16 wherein the light emitter comprises:

an array of point light sources.

18. The fingerprint imaging system of claim 17 wherein each of the plurality of point light sources comprises:

a high intensity light emitting diode having a convex lens.

19. The fingerprint imaging system of claim 16 wherein each of the plurality of spaced diffuser elements comprises a white acrylic diffuser.

20. A method of imaging a fingerprint, comprising:

providing an imaging system having an optics portion comprising a platen with a reflecting face for receiving a finger to be imaged and a light receiving surface of the platen configured to avoid internal reflection of external light passing through the reflecting face and impinging on the light receiving surface;

providing a light detector positioned to receive light reflected from the reflecting face comprising a plurality of image correction elements that provide a flat field image to an imager;

imaging a blank scan from the reflecting face to form a blank scan image;

performing a correction of the blank scan image;

forming a template based on the correction of the blank scan image;

imaging the fingerprint to form a fingerprint image; and correcting the fingerprint image based on the template.

21. The method of claim 20 wherein performing a correction comprises:

determining normalization constants for the blank scan image to bring light intensity values corresponding to the blank scan image within a predetermined range; and storing the normalization constants.

22. The method of claim 21 wherein correcting the fingerprint image comprises:

normalizing light intensity values corresponding to the fingerprint image using the normalization constants.

* * * * *

UNITED STATES PATENT AND TRADEMARK OFFICE
CERTIFICATE OF CORRECTION

PATENT NO. : 6,240,200 B1  Page 1 of 1
DATED : May 29, 2001
INVENTOR(S) : Barry M. Wendt et al.

It is certified that error appears in the above-identified patent and that said Letters Patent is hereby corrected as shown below:

Column 8, claim 12,
Line 36, "THE" should be -- A --.

Column 10, claim 25,
Line 3, "correction" should be -- correcting --.

Signed and Sealed this

Twelfth Day of March, 2002

Attest:

Attesting Officer

JAMES E. ROGAN
Director of the United States Patent and Trademark Office